United States Patent
Fillion et al.

(10) Patent No.: US 8,270,771 B2
(45) Date of Patent: Sep. 18, 2012

(54) ITERATIVE SELECTION OF PIXEL PATHS FOR CONTENT AWARE IMAGE RESIZING

(75) Inventors: Claude S. Fillion, Rochester, NY (US); Vishal Monga, Webster, NY (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 952 days.

(21) Appl. No.: 12/330,879

(22) Filed: Dec. 9, 2008

(65) Prior Publication Data
US 2010/0142853 A1 Jun. 10, 2010

(51) Int. Cl.
- G06K 9/32 (2006.01)
- G06K 9/36 (2006.01)
- G06K 15/10 (2006.01)
- G09G 5/00 (2006.01)
- G09G 5/02 (2006.01)
- H04N 5/44 (2011.01)
- H04N 9/74 (2006.01)
- H04N 3/223 (2006.01)
- H04N 1/393 (2006.01)

(52) U.S. Cl. ........ 382/298; 382/291; 382/299; 345/660; 345/698; 345/699; 348/561; 348/581; 348/582; 348/704; 358/1.5; 358/451

(58) Field of Classification Search .................. None
See application file for complete search history.

(56) References Cited

U.S. PATENT DOCUMENTS

| | | | |
|---|---|---|---|
| 6,516,096 B2 | 2/2003 | Yokose et al. | |
| 7,174,050 B2 | 2/2007 | Balmelli et al. | |
| 2003/0152288 A1* | 8/2003 | Balmelli et al. | 382/276 |
| 2007/0025637 A1* | 2/2007 | Setlur et al. | 382/276 |
| 2008/0219587 A1* | 9/2008 | Avidan et al. | 382/276 |
| 2008/0267528 A1* | 10/2008 | Avidan et al. | 382/276 |
| 2010/0027876 A1* | 2/2010 | Avidan et al. | 382/162 |
| 2010/0142853 A1* | 6/2010 | Fillion et al. | 382/298 |
| 2011/0200274 A1* | 8/2011 | Luo et al. | 382/300 |
| 2011/0211771 A1* | 9/2011 | Rubenstein et al. | 382/299 |

OTHER PUBLICATIONS

Setlur et al. "Automatic Image Retargeting", MUM 2005, p. 59-68.*
U.S. Appl. No. 12/174,767, filed Jul. 17, 2008, Fillion et al.
Avidan, et al., "Seam Carving for Content-Aware Image Resizing," 9 pages, ACM SIGGRAPH 2007.

* cited by examiner

Primary Examiner — Randolph I Chu
(74) Attorney, Agent, or Firm — Philip E. Blair; Fleit Gibbons Gutman Bongini & Bianco P.L.

(57) ABSTRACT

What is disclosed is a method for iterative seam selection in an image resizing system utilizing a seam carving technique. In one embodiment, an importance map is generated for a received source image. Seams are carved through the image from one edge to an opposite edge. An energy is computed for each seam based on pixel importance values. A distance is computed from each seam to a previously selected seam. A weighting for each seam is computed using a defined weighting function and the calculated seam distances. The weighting is applied to the energy of each seam produce a revised energy for each seam. A seam is selected based on the produced revised energy. The image is resized at a location of the selected seam. The process repeats until the image has been resized to a desired target output dimension. In such a manner, unnatural image resizing results are avoided.

20 Claims, 12 Drawing Sheets

(ORIGINAL IMAGE)

(CROPPING METHOD)

(SCALING METHOD)

(PRESENT METHOD)

ITERATIVE SELECTION OF PIXEL PATHS FOR CONTENT AWARE IMAGE RESIZING

TECHNICAL FIELD

The present invention is directed to systems and methods for content aware digital image resizing via seam carving in an image processing system.

BACKGROUND

In computer graphics, image scaling is the process of resizing a digital image. Image scaling is a non-trivial process that involves a trade-off between efficiency, smoothness, and sharpness. As the size of an image is increased, the pixels which comprise the image become increasingly visible. Apart from fitting a smaller display area, image size is most commonly decreased in order to produce thumbnails. Enlarging an image is less common because, in zooming an image, it may not be possible to discover any more information in the image than which already exists and image quality tends to suffer. Classical methods for image resizing, such as cropping and scaling, do not take into account the content of the image to be resized. Such methods are prone to distorting image content which may be important to the viewer. In order to preserve regions of the image which may be visually important to the viewer while eliminating the less important ones, image resizing techniques need to be made content aware.

Seam carving is one image resizing method. Such a method operates on "seams" that run from one side of the image across to the other. Removing all pixels in a seam reduces the image by one row or one column of pixels. Conversely, adding seams to the image can enlarge the image by one row or column of pixels. If multiple seams are removed from the same areas within the image, distortions are likely to arise and be visible in the resized image. Methods are needed for seam selection (e.g., the identification of a seam to be removed or inserted) such that repeated insertion or removal of seams will not keep occurring in the same image area, thus reducing distortions in the resized image.

Accordingly, what is needed in this art are increasingly sophisticated methods for seam selection in a content-aware digital image resizing system.

BRIEF SUMMARY

What is provided are a novel system, method, and computer program product for seam selection which avoids unnatural image resizing results that can occur when numerous seams are selected for removal (or insertion) from the same region of an image. Results demonstrate improvements over known anamorphic scaling and cropping techniques.

In one example embodiment, the present method for seam selection effectuates a reduction of a source image to a target size. A source image having a plurality of pixels is received. An importance value is determined for each pixel of the image using any of a plurality of image operators as defined herein. The collection of pixel importance values produces the importance map for the image. A plurality of seams are carved through the image. Each seam defines a path of connected pixels starting at a first boundary and ending at a second boundary of the image. A dynamic seam carving algorithm guides seam generation along a path of pixels of least importance. A weighting function is defined which creates a distribution with a peak at a center of the plot (location of a previously removed seam) and which tapers off on either side of the peak as a function of distance. A cumulative energy is determined for each seam. In one embodiment, seam energy comprises a sum of importance values of pixels in the seam path. A first seam having a lowest energy is selected. Pixel values along the path of the selected seam are removed from the source image. Importance values of pixels are removed from the importance map along a same path as the selected seam. Until the image has been resized to the desired target dimensions, the following are repeated. A plurality of seams are again carved through the image with seam carving following a path of lowest pixel importance. A cumulative energy is calculated for each of the seams. A distance is computed between each seam and the previously removed seam. A weighting is determined for each seam using the weighting function and the calculated seam distances. The weighting determined for each seam is applied to the seam's energy to produce a revised energy for the seam. A next seam having a minimum revised energy is selected. Pixel values along the path of the selected seam are removed from the image. Importance values of pixels are removed from the importance map along a same path as the selected seam. The process repeats until the image has been reduced to the desired target dimensions. The reduced image is then provided to an image output device.

In another embodiment, the present method for seam selection effectuates an enlargement of a source image to a target size. A source image having a plurality of pixels is received. An importance value is determined for each of the pixels using any of a plurality of image operators as defined herein. The collection of importance values produces the importance map for the image. A plurality of seams are carved through the image with seam carving being guided along a path of pixels of highest importance. A weighting function is defined which creates a distribution having a minimum at center of the plot (a location of the previously added seam) and increases on either side of the minimum as a function of distance. A cumulative energy is calculated for each seam. In one embodiment, seam energy comprises a sum of importance values of pixels in the seam path. A seam having a maximum energy is selected. A new seam is created having the same pixel path as the selected seam. Values are determined for each of the pixels of the newly created seam. In one embodiment, a value for a given pixel along the seam path is determined by averaging the values of pixels on either side of the pixel. Pixel values of the new seam are inserted into the image along a path adjacent to the path of the selected seam. Pixel importance values are determined for each pixel in the inserted seam using the image operator. The importance values are then added into the importance map along a same path as the newly inserted seam. Until the image has been resized to the desired target dimensions, the following are repeated. A plurality of seams are again carved through the image with seam carving following a path of highest pixel importance values. A cumulative energy is computed for each of the newly carved seams. A distance is calculated between each seam and the previously inserted seam. A weighting is determined for each seam using the weighting function and the calculated seam distances. The weighting for each seam is applied to the seam's energy to produce a revised energy for the seam. A next seam having a maximum revised energy is selected. A new seam is created having a same path as the selected seam. Values are determined for each of the pixels of the newly created seam. Pixel values of the new seam are inserted into the image along a path adjacent to the path of the selected seam. Importance values are determined for the pixels in the new seam using the image operator. The importance values are added into the importance map along a same path as the newly inserted seam. The process repeats until the image has been enlarged to the desired target output dimensions. The enlarged image is then provided to an image output device.

Advantageously, the present image resizing method can be readily implemented in hardware and/or software and made user selectable by the placement of an iconic representation thereof on a user interface such that, when the icon is selected, the present method is effectuated on the received source image. Various features, enhancements, and embodiments have been provided.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method for content-aware image resizing of digital images. Image reduction and/or enlargement are effectuated through a novel iterative seam selection method as described in detail herein.

It should be understood that one of ordinary skill in this art would be readily familiar with many facets of image processing such as image resizing, image operators, pixel importance values and importance maps for images, seam-carving techniques, and other algorithms and techniques common to the digital image resizing arts. Additionally, one of ordinary skill would be familiar with advanced mathematical techniques, equations, and algorithms common in this art. One of ordinary skill would also be knowledgeable about computer science and software and programming systems and methods sufficient to implement the functionality and capabilities described herein in their own hardware environments without undue experimentation.

A pixel, as used herein, refers to the smallest segment into which a digital image can be divided. Each received pixel has one or more color values associated with it. Pixel values can be gray scale values or coordinates in color space. Pixels of a received image can be converted to a chrominance-luminance space using, for instance, a RBG-to-YCbCr converter to obtain luminance (Y) and chrominance (Cb,Cr) values for each pixel. Given that detailed image geometry tends to reside in the luminance channel, processing efficiency can be achieved by first converting the image to a chrominance-luminance space, calculating importance maps based upon the luminance channel only, removing selected pixels from the three luminance-chrominance channels, then converting the image back to it's original color space. It should be appreciated that pixels may be represented by values other than YCbCr which can be used by an image operator to determine a pixel importance value.

An image processing system, as used herein, refers to any hardware or software system capable of performing an image resizing operation. Resizing is understood to mean any of an image enlargement or an image reduction. Outputting a resized image means communicating information about the resized image to an image output device. Such communication may take the form of transmitting the resized image in the form of signals over a network or communication pathway, or storing the resized image on a memory, storage media or device. Image output devices include printers and other color marking devices, xerographic devices, image production and photographic equipment, monitors and displays, and other devices capable of receiving signals of the resized image and providing these to a device capable of reducing the image signals to viewable form.

Figure 1:
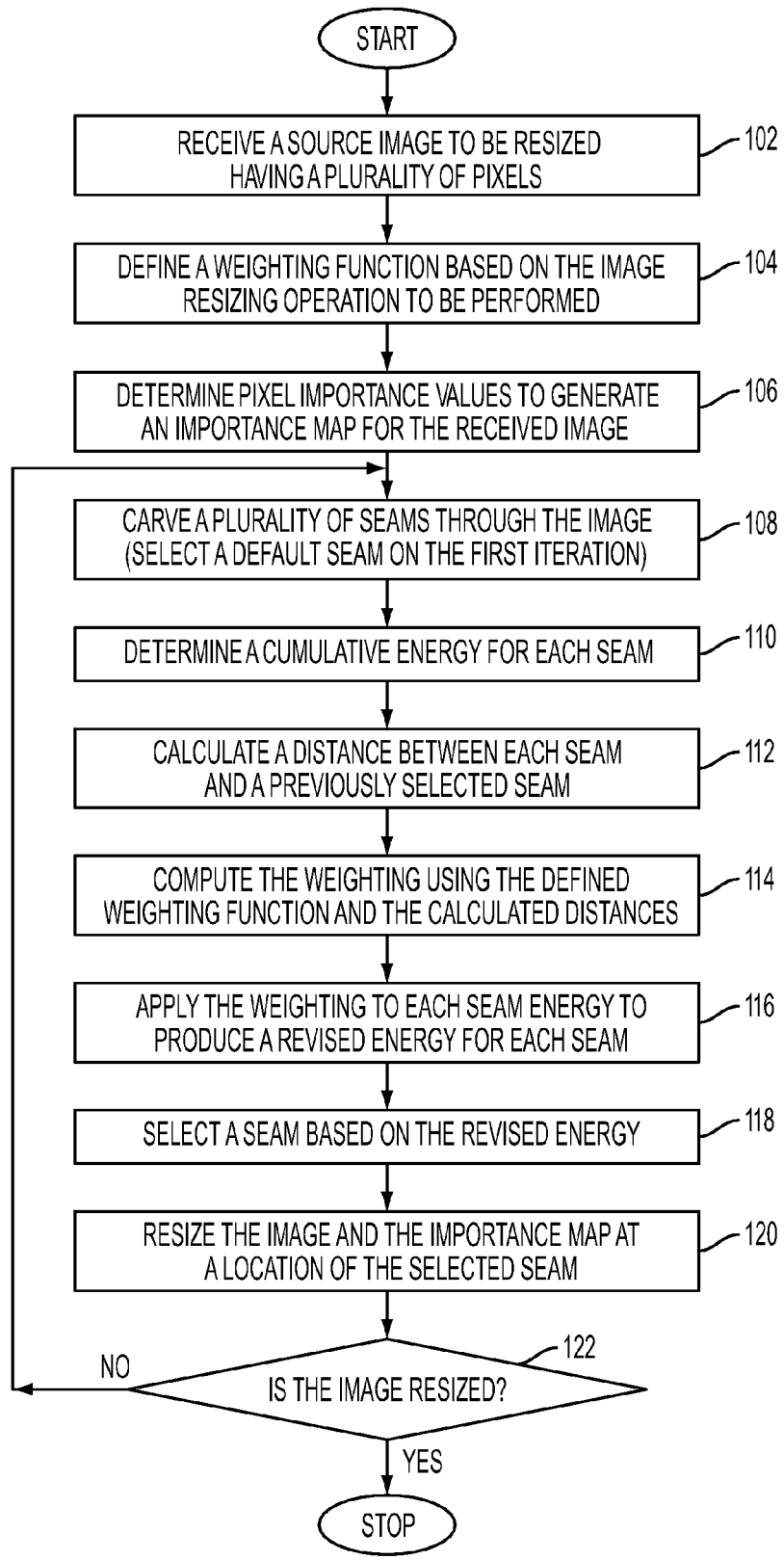
FIG. 1 is a flow diagram of one example embodiment of the present method of image resizing in a image processing system.

Reference is now being made to the flow diagram of FIG. 1 which illustrates one example embodiment of the present method of image resizing in an image processing system.

In the embodiment, at 102, an image having a plurality of pixels is received in a manner known in the arts. Each of the pixels has at least one intensity value associated therewith. Pixel values of the received image can be obtained using a scanning device or retrieved from storage. Alternatively, values for pixels of the image to be resized can be obtained over a network connection from a remote device.

At 104, a weighting function is defined for the source image. The weighting function is designed to generate a distribution of values as a function of distance. The nature of the weighting function is based on the resizing operation to be performed on the image. In image reduction, the weighting function is designed to create a distribution having a peak at a location of a previously removed seam and which tapers off on either side of that peak. An example distribution generated by a weighting function used for image reduction is shown with respect to the plot of FIG. 4. In image enlargement, the weighting function is designed to create a distribution which has a minimum at a location of a previously inserted seam and which increases on either side of that minimum. An example distribution generated by a weighting function used for image enlargement is shown and discussed with respect to the plot of FIG. 7.

At 106, an importance value is determined for each pixel in the image. Importance values are determined using any of a plurality of image operators designed to be responsive to changes in pixels based on image content. The determination of a pixel's importance is done with respect to a neighborhood of surrounding pixels. The collection of pixel importance values produces the importance map for the image.

The following steps are repeated until a target size of the image has been achieved. At 108, a plurality of seams are carved through the image using a seam carving technique along an axis to resize the image accordingly. In image reduction, seams are guided along a path of pixels of lowest importance values. In image enlargement, seams are guided along a path of pixels of highest importance values. Each seam comprises a path of pixels which traverses the image from a first boundary to a second boundary of the image. Example seams are shown having been carved through an example source image and discussed herein further with respect to FIG. 5.

At 110, an energy is determined for each seam using the importance values of pixels along the seam's path through the importance map. A seam's energy is computed as a sum of importance values of pixels in the seam path.

At 112, a distance is calculated between each seam and a previously selected seam. On the first iteration, a default first seam is selected based on the cumulative seam energy. In image reduction, the first seam is selected having a minimum cumulative seam energy. In image enlargement, the first seam is selected having a maximum cumulative seam energy.

At 114, a weighting is computed for each seam using the weighting function and the calculated seam distance. At 116, the weighting is applied to the seam energy to produce a revised energy for each seam. If a default first seam is not initially selected, the weighting is not applied on the first iteration because there is no previous seam from which to calculate seam distances.

At 118, select a seam based on the revised energy. In image reduction, the seam is selected having a minimum revised energy. In image enlargement, the default first seam is selected having a maximum revised energy.

At 120, the image is resized at a location of the selected seam. In image reduction, pixels along the path of the selected seam are removed from the image. Pixel importance values are deleted from the importance map along a same path as the selected seam. In image enlargement, a new seam is created having the same pixel path as the selected seam. Pixel values are determined for each pixel of the newly created seam. In one embodiment, a value is determined for a given pixel in the seam path by averaging values of pixels on either side of the pixel. The pixel values of the new seam are added into the image at a location along a path with is adjacent to the path of the selected seam. Pixel importance values are then determined for each of the pixels of the inserted seam using the image operator. The pixel importance values are added into the importance map along a same path as the pixel path of the newly inserted seam. The removal of a seam from the image or the insertion of a new seam into the image produces an image which has been resized by the width of the inserted or removed seam. The addition or deletion of pixel importance values to/from the importance map produces a revised importance map for the current iteration. After each iteration, rows/columns of the revised importance map mirror that of the resized image such that a one-to-one correspondence between pixel importance values and pixels is maintained.

At 122, a determination is made whether the image has been resized to the desired dimensions. If the image still requires further resizing then processing repeats with respect to step 108 using the resized image and the revised importance map for the start of the next iteration. If the image has been resized then processing stops. Thereafter, the resized image is communicated to an image output device such as a printer, a display, or a storage device.

Figure 2:
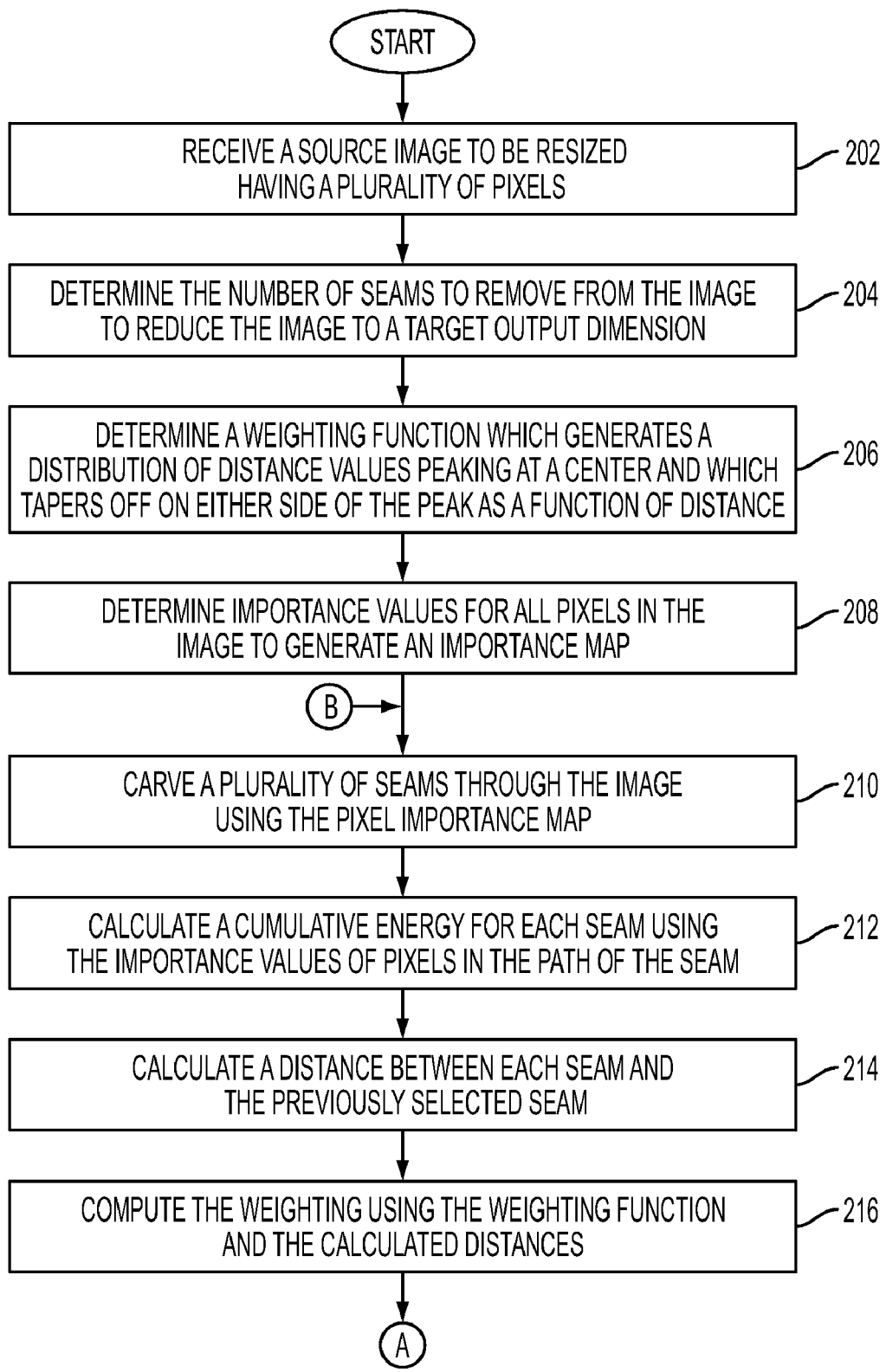
FIG. 2 is a flow diagram of one example embodiment of image reduction performed in accordance with the present image resizing method.

Reference is now being made to FIG. 2 which is a flow diagram of one example embodiment of an image reduction operation performed in accordance with the present image resizing method.

At 202, a source image to be resized is received. The source image comprises a plurality of pixels having individual values. Images can be received in digitized form from any of a wide variety of image capture and image scanning devices known in the arts. Alternatively, information about the pixels of the image are received over a network or retrieved from storage or memory.

At 204, a number of seams necessary to resize the source image to the desired target dimensions is determined. The number of seams to be removed from the image is readily determined by calculating a difference between the size of the original image and the size of the desired target dimensions. Since seams are typically one pixel wide (but can be wider), the number of seams to be inserted (or removed) from the image sufficient to resize the image can be readily ascertained.

At 206, a weighting function is defined for the source image. The weighting function is based on the image resizing operation to be performed on the image. In an image reduction context, the weighting function is designed to create a distribution having a peak at a center (a location of the previously removed seam) and which tapers off on either side of the peak as a function of distance. The weighting function distributes the seam distances such that seams are not repeatedly selected from the same image region. The center (minima or maxima) of the distribution is shifted such that the center of the plot falls on a location of the previously removed seam or the previously inserted seam.

Figure 4:
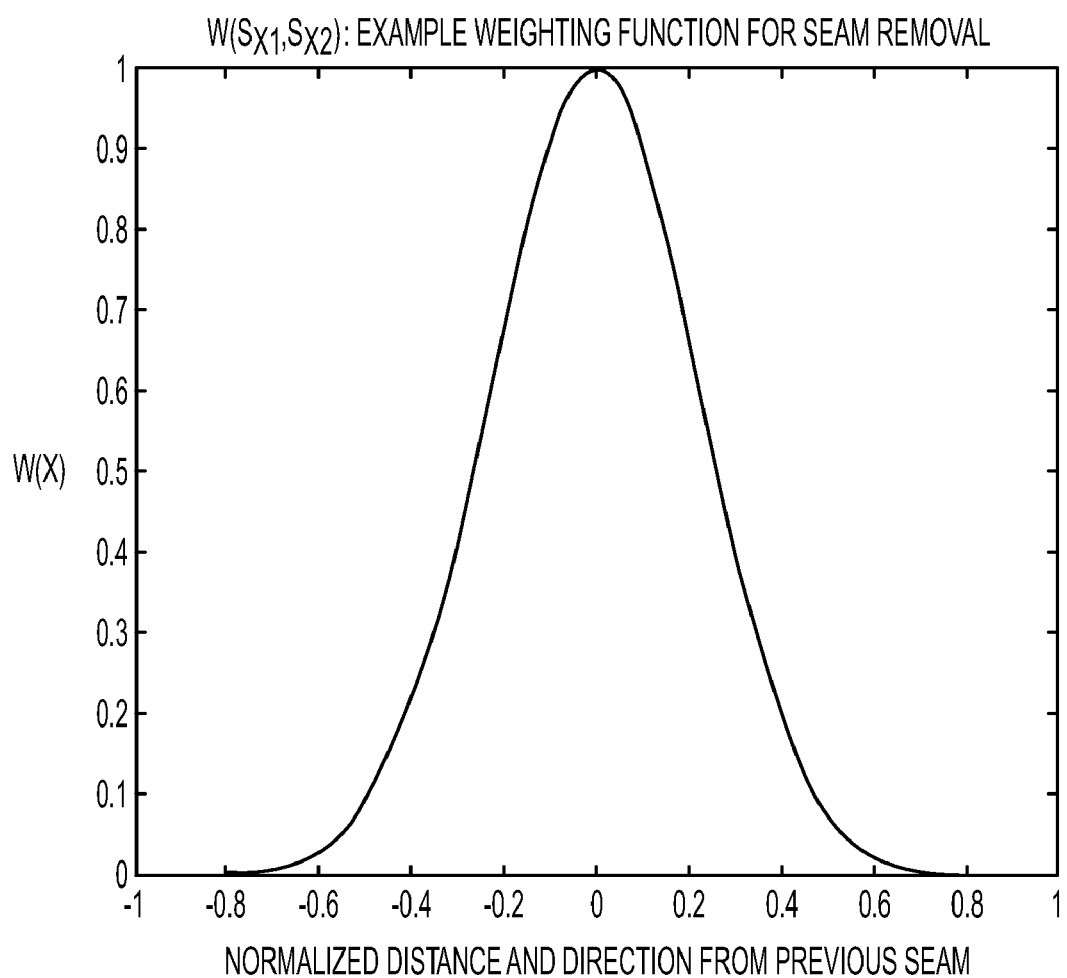
FIG. 4 is a graph of the weighting function used to generate a distribution having a peak at the location of a previously selected seam.

Attention is respectfully directed to FIG. 4 showing a plot of the weighting function generating a (Gaussian-like) distribution of seam distances from a previously removed seam. The distribution has a peak centered at the location of the previously removed seam and tapering off on either side of that peak. Note that the x-axis units are given in normalized space because seam distances will vary from image to image. Thus the plot can be interpreted as a percent of maximum seam-to-seam distance. The x-axis is shown including distance and direction because negative distances do not make sense in this context.

One example weighting function takes an exponential form given by:

$$w(S_{x1}, S_{x2}) = e^{-\beta d(S_{x1}, S_{x2})},$$

where $\beta$ is a constant which controls the rate of decrease from the peak value, and $d(S_{x1}, S_{x2})$ is the distance between a first seam $S_{x1}$ and a second seam $S_{x2}$ (the current seam and the previously removed seam). This produces a weighting w which will be applied to the energy of this seam. Other weighting functions which distribute seams as a function of distance from a previously selected seam are intended to fall within the scope of the appended claims.

At 208, an importance value is determined for each of the pixels in the received source image. Methods for determining pixel importance values are known in the arts. Generally, the importance of a pixel is estimated by its amount of contrast with pixels in a neighborhood of surrounding pixels. The value of a pixel's importance is determined using an image operator designed to be responsive to pixel changes. Image operators calculate an importance value for a given pixel based on characteristics of pixels as compared against neighboring pixels surrounding it. Example image operators are: a gradient operator, probabilistic entropy, Laplacian transform, Hough transform, visual saliency, and a face detection operator. A discussion as to the features, benefits, and differences of various image operators is beyond the scope of this disclosure. Each image operator brings different characteristics to bear on the calculation of an importance value for any given pixel given the characteristics of pixels in a neighborhood of surrounding pixels. Thus, different image operators may produce different importance values for the same set of pixels. The collection of pixel importance values produces the importance map for the image. Pixel importance values can be further normalized such that each falls within a defined set of parameters.

One example image operator is the probabilistic entropy operator. From this formulation, an importance value (local entropy) is determined for each pixel based upon a probability (or relative occurrence) of a pixel intensity value within a neighborhood of pixels surrounding the current pixel. The probabilistic entropy operator is given by:

$$e(I) = -\sum_{k=0}^{G-1} P(k)\log_2(P(k))$$

where G is the number of distinct pixel values and P(k) is the probability of each pixel intensity value within a neighborhood of pixels surrounding the pixel.

It should be understood at this point that a one-to-one correspondence exists between the image, comprising a 2-dimensional array of pixel values, and the importance map comprising a 2-dimensional array of pixel importance values. Seams through the image thus follow an identical path through the importance map. Removal of a seam of pixels from the image means that the corresponding pixel importance values associated with that seam are removed from the importance map along a same path through the importance map as the removed seam took through the image. Likewise, a seam of pixel values added into the image means that the corresponding pixel importance values are added into the importance map along a same path through the importance map as the inserted seam took through the image. In such as manner, the one-to-one correspondence is maintained.

At 210, a plurality of seams are carved through the image. Each seam defines a path of pixels through the image. The same path is followed through the importance map. The path of pixels starts from a first boundary and ends at a second boundary of the image. The maximum number of seams that can be carved through a given image is defined by the number of pixels along an axis of the image. Seams are typically carved having a width of one pixel; although seams may have greater widths. A seam carving algorithm carves a path of connected pixels through the image by iteratively selecting a next pixel in the seam's path based on pixel importance values (highest or lowest). One seam carving technique is disclosed in: *Seam Carving for Content-Aware Image Resizing*, by: Shai Avidan and Ariel Shamir, ACM Transactions On Graphics (TOG), Vol. 26, Issue 3, (July 2007), ISSN: 0730-0301, which is incorporated herein in its entirety by reference.

Additional pixel selection criteria can be programmed into a seam carving algorithm. For instance, criteria can be added to effectuate a determination in cases wherein the seam carving algorithm encounters two or more pixels having identical importance values. Optionally, protected areas of the image can be identified before a seam carving algorithm is applied to the source image. Such protected areas of the image can be given higher importance values (or lower values in the case of seam insertion). As the seam carving algorithm traverses the image, pixels within the defined protected areas would be avoided and thus not become part of the current seam. The seam carving algorithm would select the next adjacent pixel in a pixel path around the defined protected areas as the seam traverses the image. In such a manner, seams which pass through a protected area of the image would have higher seam energy (or lower energy for seam insertion) to preclude them from being selected.

Figure 5:
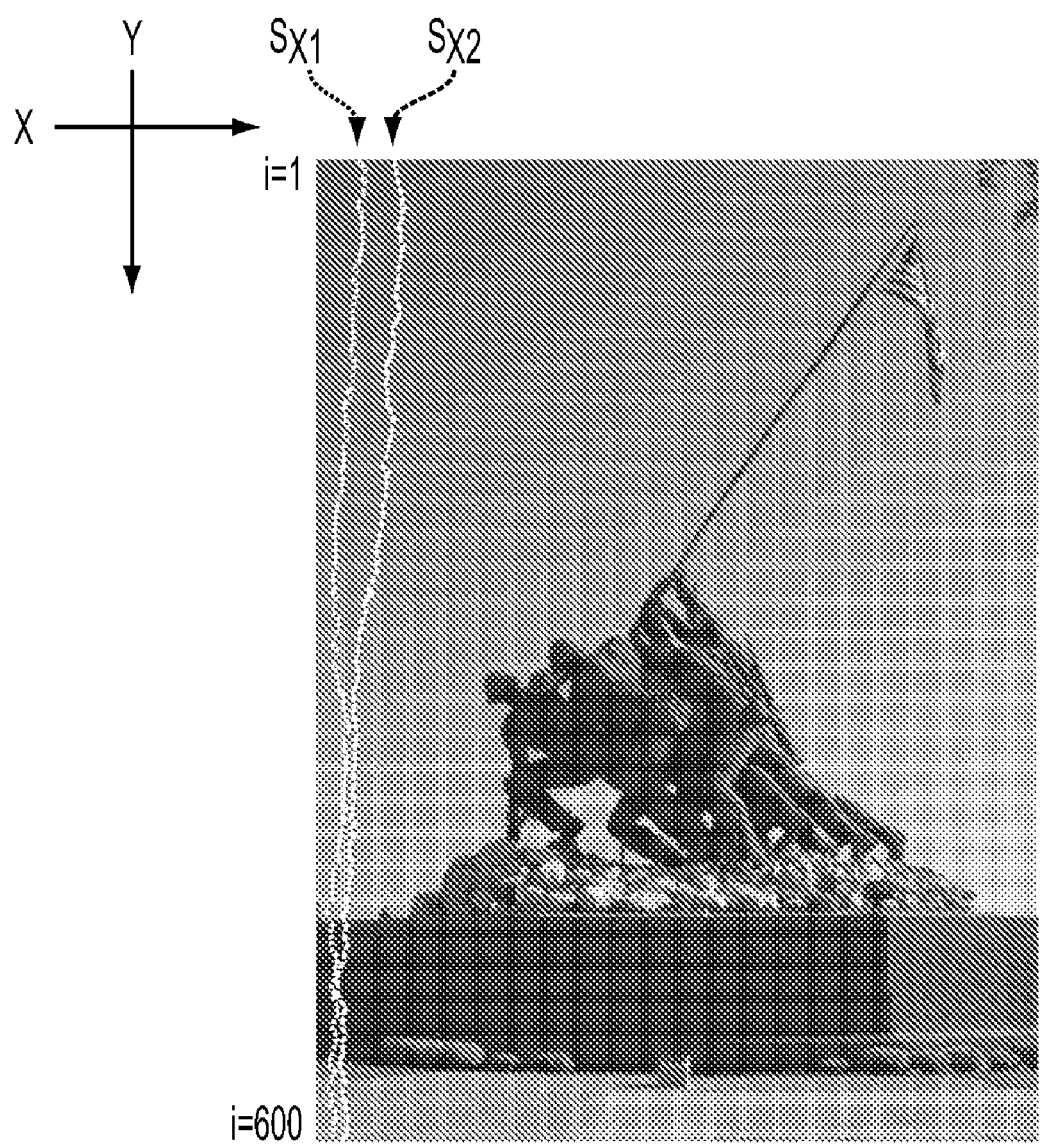
FIG. 5 is an example source image showing two seams having been carved through the image from a top edge to a bottom edge.

Attention is respectfully directed to FIG. 5 which shows two seams carved through an example source image. The two seams, given by: $S_{x1}$ and $S_{x2}$, traverse the image from a first boundary (axis edge) to a second boundary (axis edge). Seams are carved through the image along one axis or the other depending on the axis along which the image is to be resized. For instance, if the image is to be resized along an x-axis then the seams would traverse the y-axis. In those instances wherein the image is to be resized along both the x and y-axis, the image would first be resized in one direction then resized in another. Alternatively, the image is iteratively resized alternating between the two axes until the target dimensions have been achieved.

Reference is again being made to the flow diagram of FIG. 2.

At 212, an energy is calculated for each seam. In one embodiment, seam energy is computed as the cumulative sum of importance values of all pixels in the seam's path. Other embodiments for determining an energy for a seam are intended to fall within the scope of the appended claims. Seam energy is preferably computed using the importance values of all pixels in the seam but seam energy may be computed using only a subset of pixels in the seam path.

At 214, a distance is determined between each seam and the last removed seam. On a first iteration, a first seam is selected having a lowest seam energy and the first selected seam is removed from the image. The importance map is revised accordingly by deleting from the map each of the importance values of pixels along a same path as the removed seam. Alternatively, a default seam is identified as the "previously selected seam" for the first iteration This seam is then used for the computation of seam distances on the first iteration of the present method.

In one example embodiment, a distance between a first seam $S_{x1}$ and a second seam $S_{x2}$ is given by:

$$d(S_{x1}, S_{x2}) = \sum_{i=1}^{n} (|s_{x1,1}^{(i)} - s_{x2,1}^{(i)}| + |s_{x1,2}^{(i)} - s_{x2,2}^{\prime(i)}|),$$

where $S_{x1}\{(s_{x1,1}^{(i)}, s_{x1,2}^{(i)})\}_{i=1}^{n}$, $S_{x2}\{(s_{x2,1}^{(i)}, s_{x2,2}^{(i)})\}_{i=1}^{n}$ and n is a number of rows (or columns) of pixels in the image. The above-defined distance function is only one example embodiment for determining a distance between two seams along an axis of the image. Other methods for determining a distance between seams are intended to fall within the scope of the appended claims.

At 216, a weighting is computed for each seam using the weighting function and the calculated seam distance. Each weighting for each seam is based on the distance from the current seam to the previously selected (removed or inserted) seam.

Figure 3:
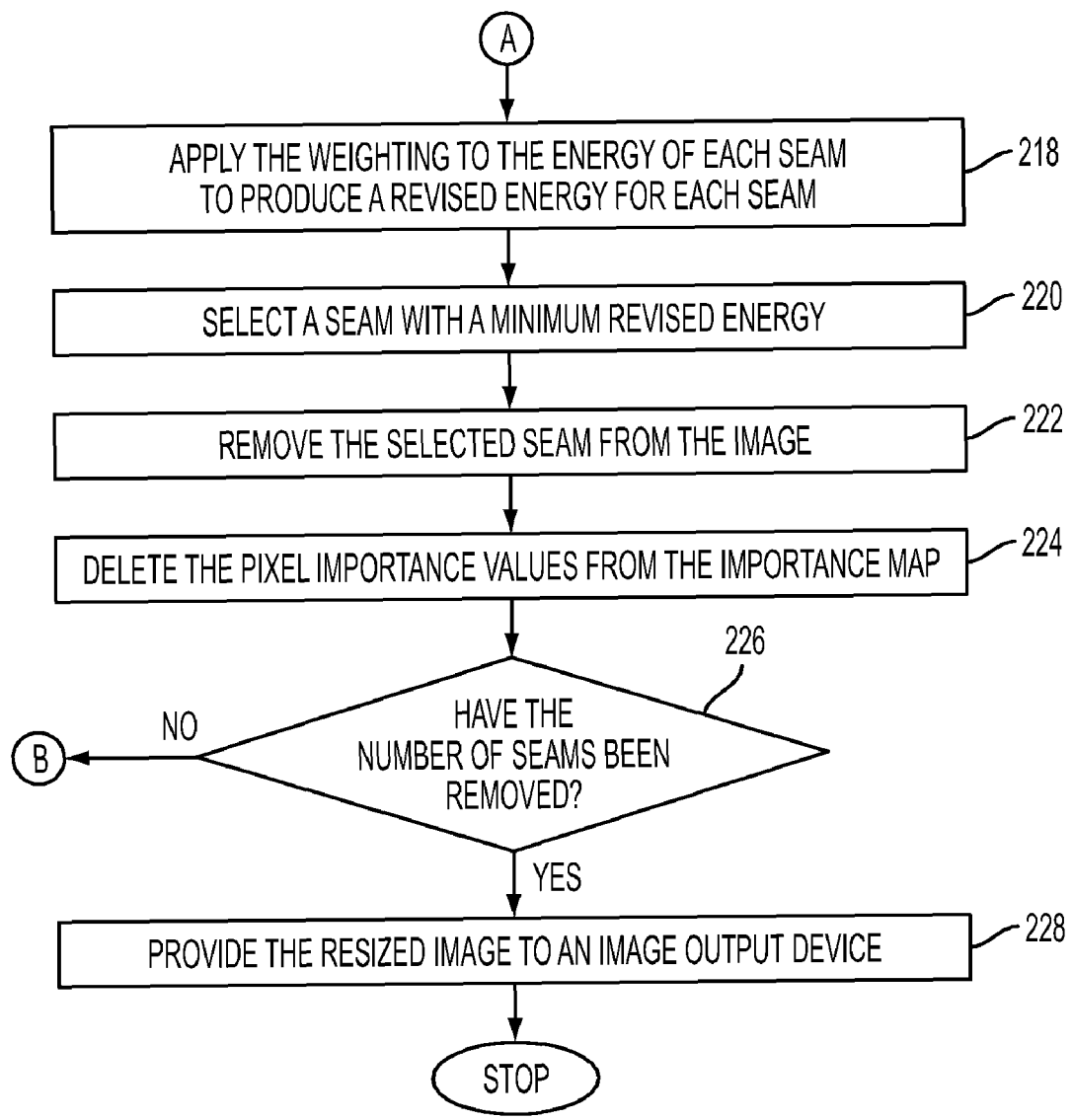
FIG. 3 which is a continuation of the flow diagram of FIG. 2 with flow processing continuing with respect to node A.

Reference is now made to the flow diagram of FIG. 3 which is a continuation of the flow diagram of FIG. 2 with respect to node A.

At 218, the weighting for each seam is applied to the energy of each seam to produce a revised energy for each seam. In one embodiment, the above-defined weighting w is applied to the energy $e(S_{x1})$ of seam $S_{x1}$ to produce a revised energy $e'(S_{x1})$ for the seam, as follows:

$$e'(S_{x1})=e(S_{x1}) \cdot w(S_{x1}, S_{x2}).$$

At this point, the calculated weighting based on seam distances has been applied to each of the seams to produce a revised energy for each seam.

At 220, a seam having a minimum revised energy is selected. In an alternative embodiment, seams having a revised energy which falls below a predetermined threshold are identified and presented to the user overlaid on the image. The user selects one of the identified seams for removal.

At 222, the selected seam is removed from the image. In other words, pixel values along the seam path are deleted from the image. Deleting the pixel values along the path of the seam produces a resized image. Images are understood to be 2-dimensional arrays of pixel arranged about 2-axis in row/column format. Methods for removing pixels from an image vary. In one embodiment, as seams are carved through the image along a path of pixels, pointers from one pixel are connected to a next pixel in the array. Using such a software construct, pixels are deleted from a seam path by traversing the linked pointers from pixel to next pixel and removing the pixels (and tying off the pointers) until the end of the seam has been reached. Techniques for traversing linked lists are well established. Software methods for removing pixels from an image will depend on the format of the arrayed pixel values and the specific implementation used for seam carving and pixel manipulation. At 224, the pixel importance values associated with the removed seam are deleted from the importance map. The importance values are deleted along a same path as the path of the selected seam. Importance values are deleted from the importance map using a same technique for deleting pixel values from the 2-dimensional array of the source image. Deleting the pixel importance values from the importance map produces a revised importance map for the current iteration. In such a manner, the revised importance map and the resized image maintain their one-to-one correspondence.

At 226, a determination is made whether a sufficient number of seams have been removed from the image. If more seams remain to be removed to sufficiently resize the source image to the desired target dimensions, then the process repeats and the flow continues with respect to node B (of FIG. 2). The process repeats until the determined number of seams have been removed and the image has been reduced to the desired dimensions. Once the image has been sufficiently resized, at 228, the resized image is communicated to an image output device.

Figure 6:
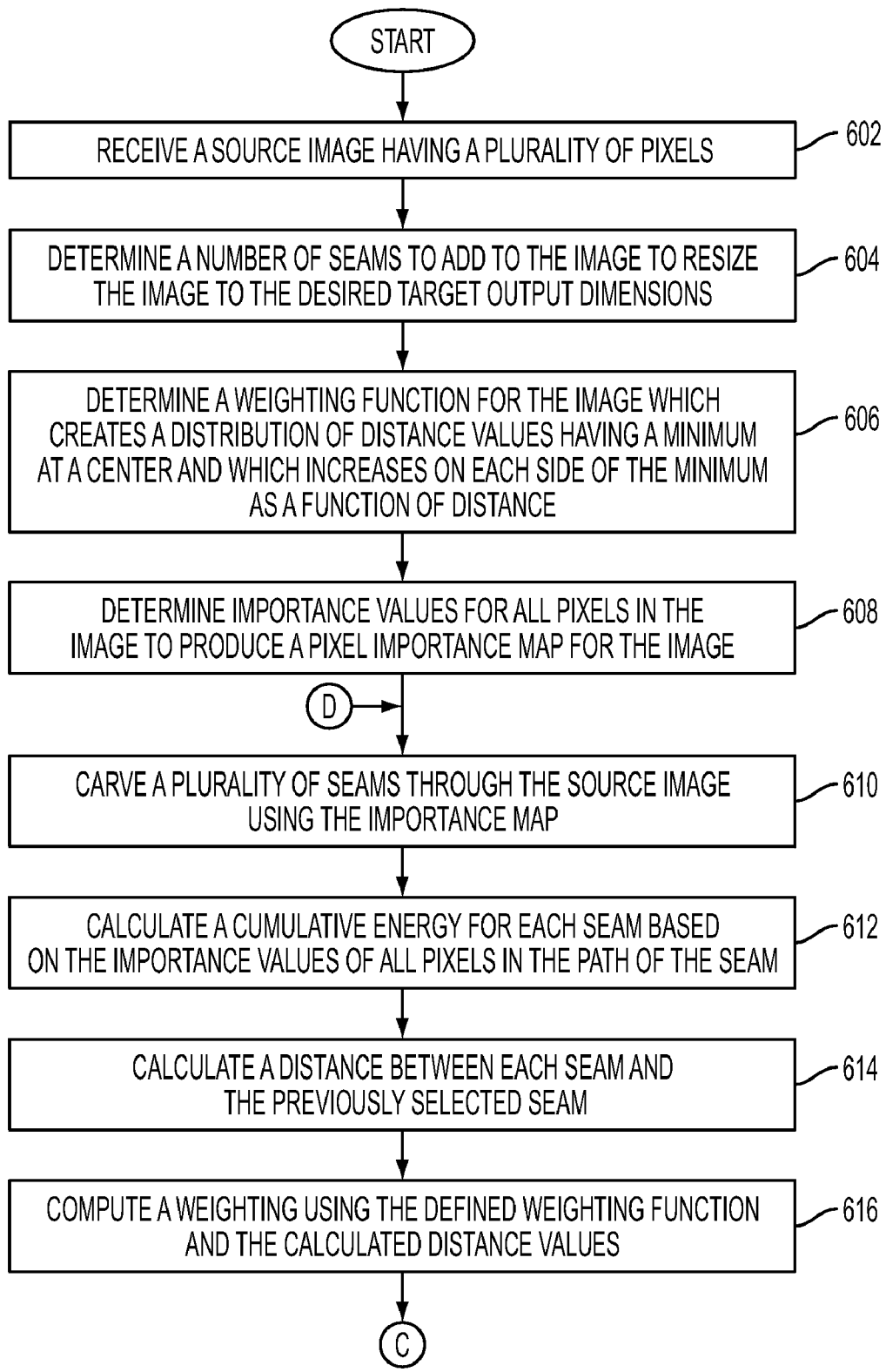
FIG. 6 is a flow diagram of one example embodiment of image enlargement performed in accordance with the present image resizing method.

Reference is now being made FIG. 6 which is a flow diagram of one example embodiment of image enlargement performed in accordance with the present image resizing method.

Figure 7:
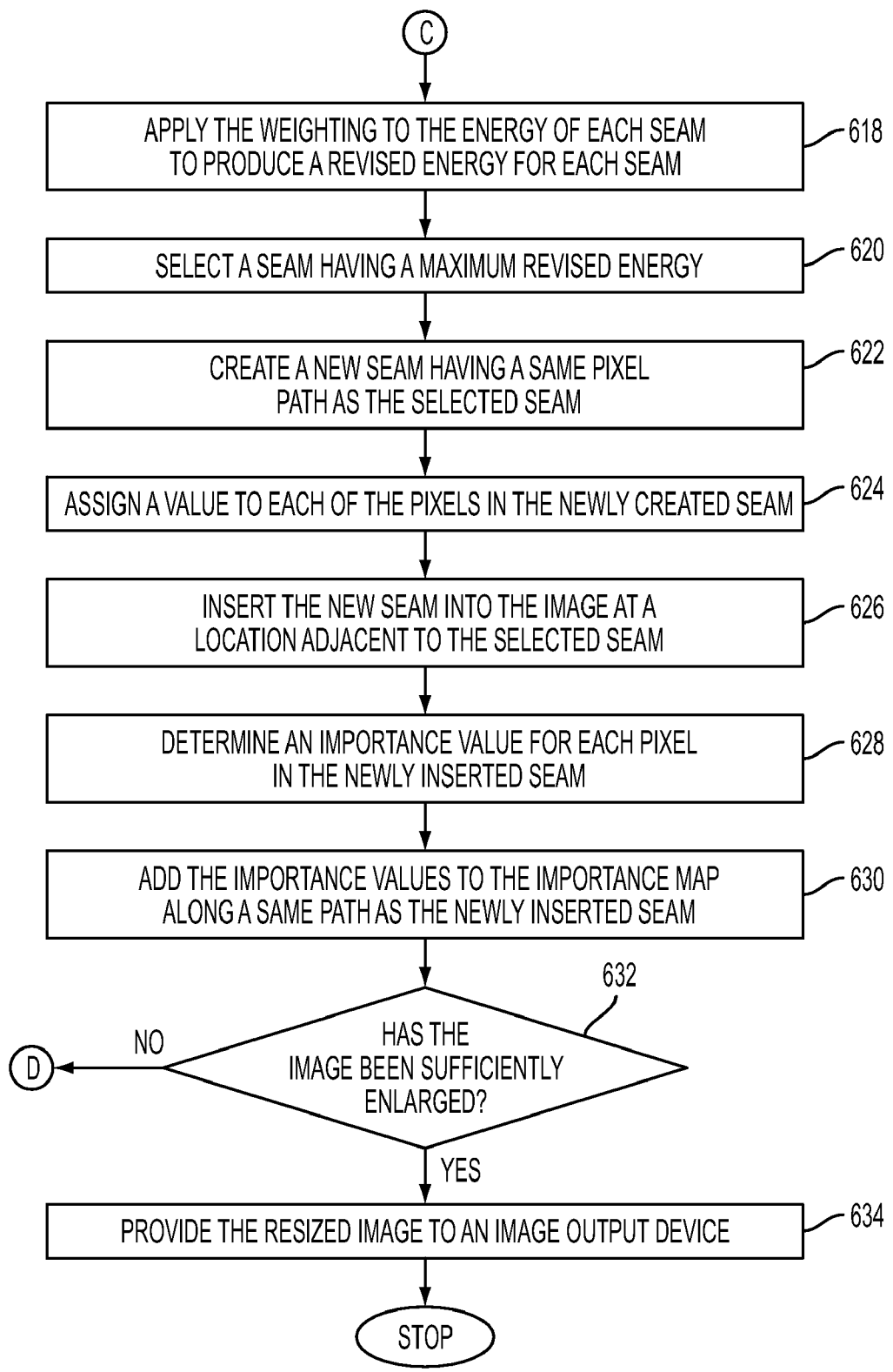
FIG. 7 which is a continuation of the flow diagram of FIG. 6 with flow continuing with respect to node C.
Figure 8:
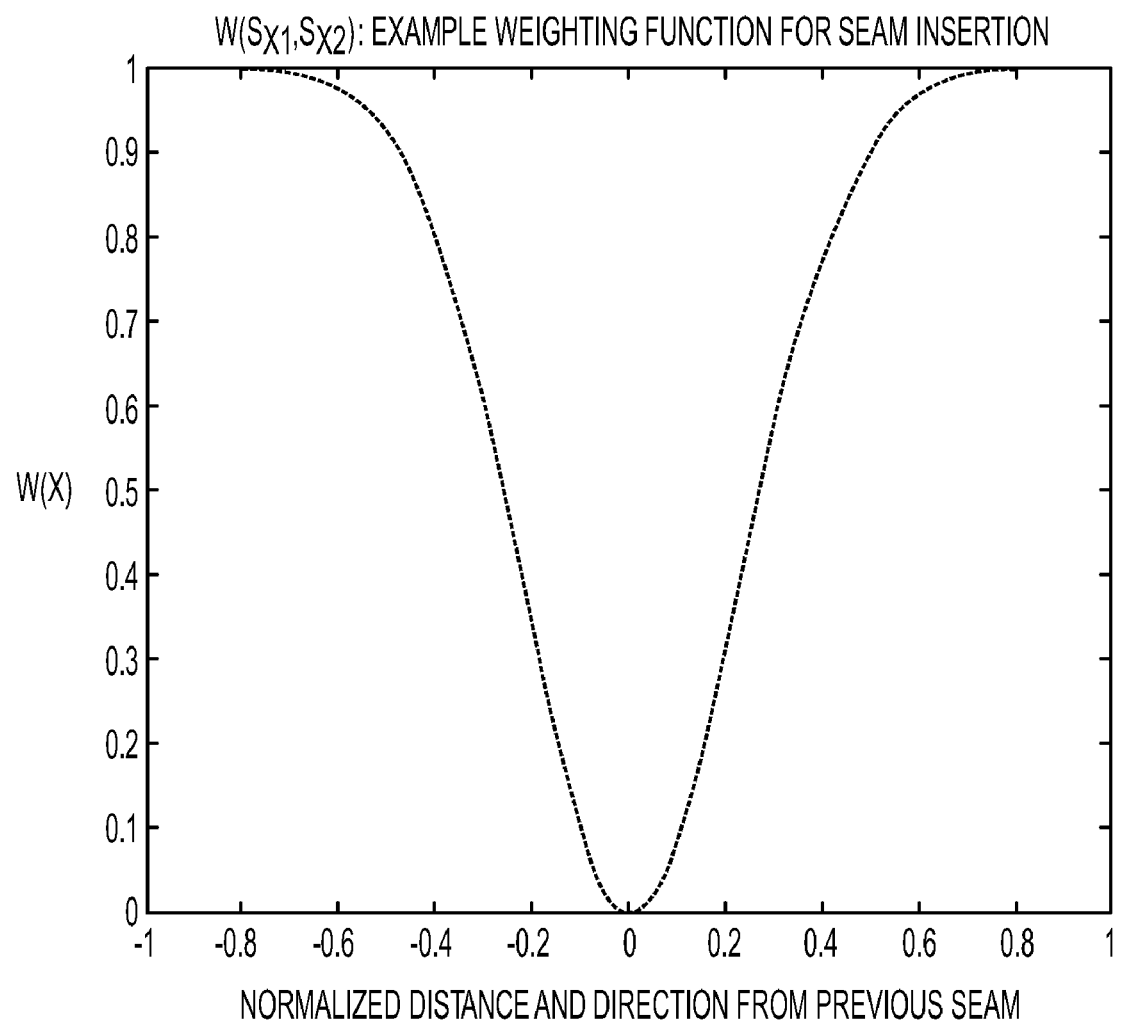
FIG. 8 is a graph of a weighting function which generates a distribution having a minimum at the location of a previously selected seam.

At 602, a source image having a plurality of pixels is received. The image is received in a similar manner as method described with respect to the flow diagram of FIGS. 2 and 3. At 604, a number of seams to be added to the image are determined. Inserting seams into the image enlarges the image by the width of the seam. Seams are added to the image until the image has been enlarged to the desired target output dimensions. At 606, a weighting function is defined for the source image which creates a distribution having a minimum centered on a location of a previously inserted seam and which increases on either side of the minimum as a function of distance to the previously inserted seam. One example weighting function which produces the desired distribution is the inverse weighting function given by:

$$w(S_{x1}, S_{x2})=1-e^{-\beta d(S_{x1}, S_{x2})},$$

where $\beta$ is a constant which controls the rate of increase from the minimum. FIG. 7 shows the distribution of the example weighting function used for enlargement.

At 608, importance values are determined for each pixel in the image using the image operator. The collection of pixel importance values produces the importance map for the image. At 610, a plurality of seams are carved through the image. Seam carving is guided along a path of pixels of highest importance values. At 612, an energy is determined for each of the newly carved seams. In one embodiment, the cumulative energy for a given seam is determined by a sum of pixel importance values for all pixels in the path of the seam. At 614, a distance is computed between each seam and the last inserted seam. On a first iteration, a first default seam is selected having the maximum cumulative energy and distances are computed relative to the default seam. At 616, a weighting is computed for each seam using the defined weighting function and the calculated distance values.

Reference is now made to FIG. 7 which is a continuation of the flow diagram of FIG. 6 with flow continuing with respect to node C.

At 618, the weighting for each seam is applied to the seam energy to produce a revised energy for each seam. At 620, a seam having a maximum revised energy is selected. At 622, a new seam is created having a same pixel path as the selected seam. The newly created seam will be inserted into the image and thus enlarge the image by the width of the seam. At 624, values are assigned to the pixels of the newly created seam. In one embodiment, pixel values are determined by averaging the values of the pixels on either side of the pixel. On an edge where there are only pixels on one side of the current pixel, the lone adjacent pixel can be assigned to the current pixel. At 626, the new seam is inserted into the image at a location adjacent to the selected seam. At 628, an importance value is determined for each pixel in the newly inserted seam using an image operator. At 630, pixel importance values are added to the importance map along a same path as the newly inserted seam. In such a manner, the resized image (having been resized by the width of the newly inserted seam) and the importance map (having been revised by the addition of the importance values of the pixels of the new seam) maintain their one-to-one correspondence between pixels of the image and pixel importance values of the importance map. At 632, a determination is made whether the desired target dimensions have been achieved. If not, then processing continues with respect to node D (of FIG. 6). The process repeats until a number of seams have been added to the image sufficient to enlarge the image to the desired target output dimensions. At 634, the resized image is provided to an image output device in a manner as discussed with respect to image reduction.

Figure 9A:
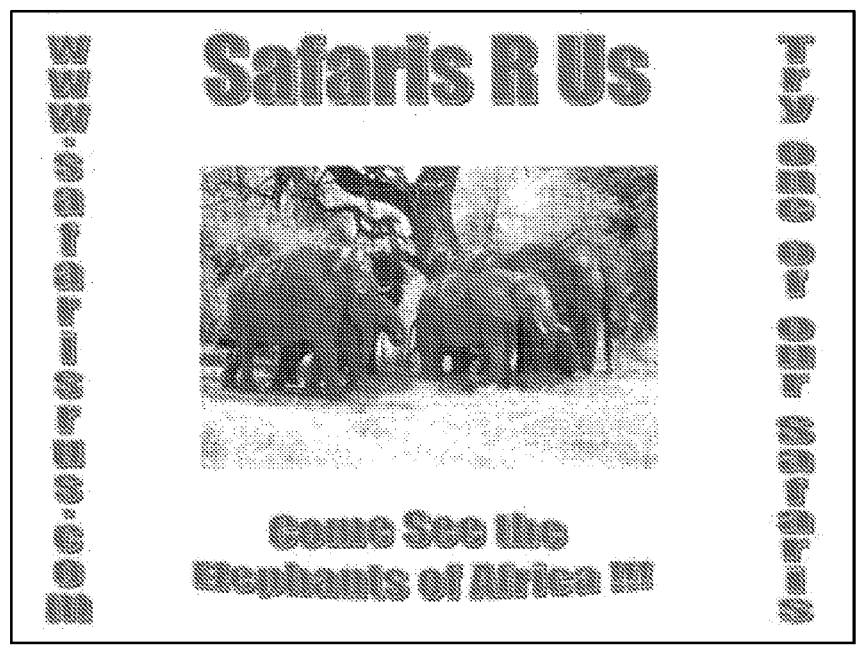
FIGS. 9A-B illustrates an original image (FIG. 9A) which has been reduced using a cropping technique for comparison purposes with the image resizing technique of the present method.
Figure 9B:
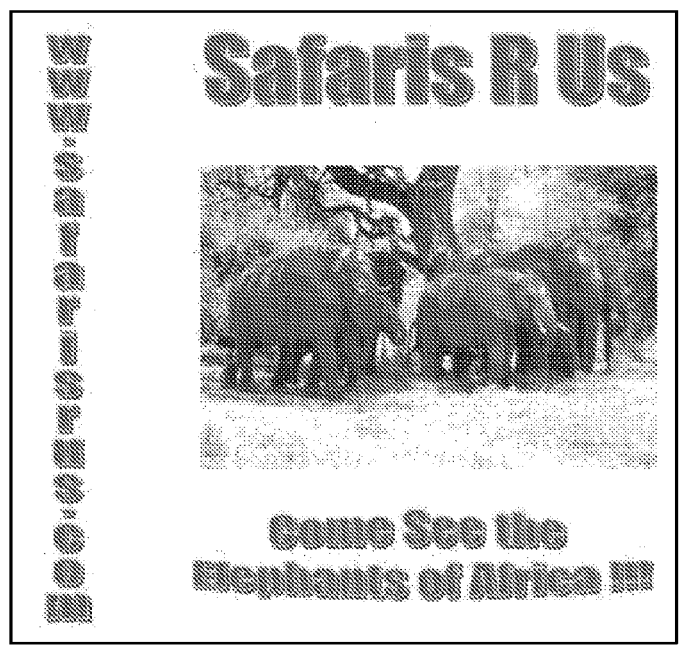
Figure 10A:
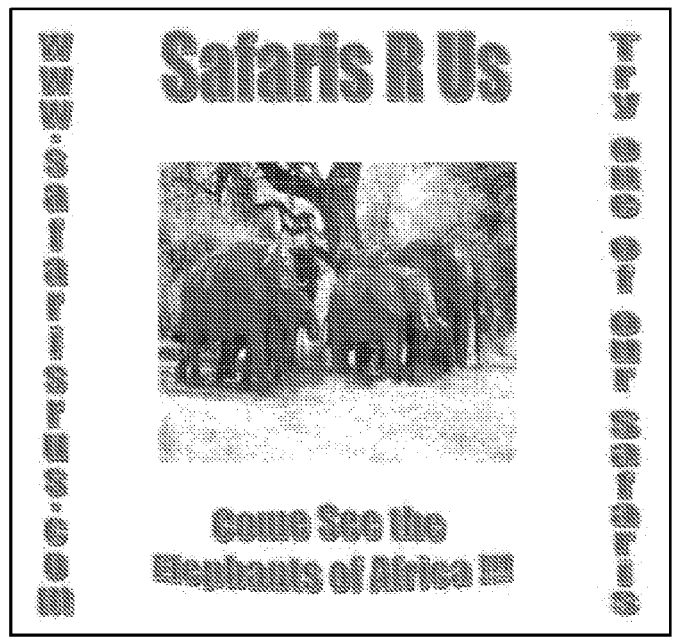
FIGS. 10A-B illustrates the original image (FIG. 9A) which has been reduced using a scaling technique for comparison purposes with the image resizing technique of the present method.

Reference is now made to FIGS. 9 and 10 which provide a visual comparison of a source image 9A to be resized. FIG. 9B shows the result of an image cropping having been performed on the source image. FIG. 10A shows the result of an image scaling having been performed on the source image.

Figure 10B:
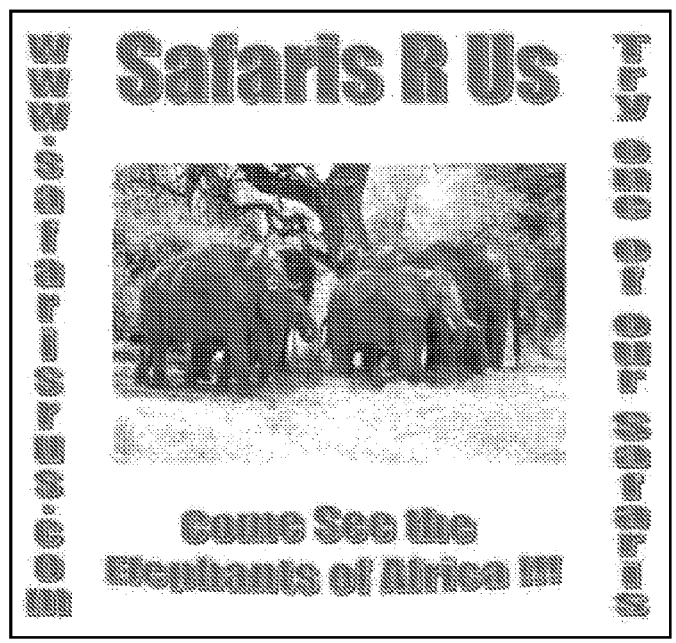

FIG. 10B shows the result of the image having been resized using the present iterative seam selection method.

In an implementation hereof, the present image resizing method is a hardware or software construct in the image path of a document reproduction device having a user interface and an image scanner. A "SMART RESIZING" icon is displayed on the user interface. A selection of this icon activates the hardware or software construct of the present seam selection method. Upon selection of the resizing icon by a user thereof, an icon for "REDUCTION" and another for "ENLARGEMENT" is displayed. When the appropriate icon is selected, the received image is resized according to one of the above-described image enlargement and image reduction operations. The present image resizing method may alternatively be made user-selectable by the placement of the icon on the display of a desktop computer and the image to be resized is obtained from a scanning device placed in communication with the desktop computer or received over a network connection or retrieved from a storage device. The user selects to resize the image using the present method. The resized image is then communicated to an image output device such as a printer for reduction to viewable form. Alternatively, the resized image is sent over a network to an image reproduction device or is provided to a storage device or memory.

In one embodiment, in the instance wherein a user selects "REDUCTION", the user is prompted to place the source image on the paten of a scanning device and to scan the image into digitized form. Upon completion of the scanning operation, pixel importance values are determined for each pixel in the received image using an image operator. Alternatively, the user selects one of the image operators from a set of pre-loaded operators for determination of the importance values for each pixel. Depending on the level of sophistication of the implementation hereof, the user may select certain image operators to be applied to certain areas of the scanned image. The collection of pixel importance values generated by the image operator(s) produces the importance map for the image. A weighting function, which creates a distribution which peaks at a center of the plot (location of a previously removed seam) and which tapers off on either side of that peak, is selected by the user. Alternatively, a default weighting function is automatically retrieved from storage or memory. The user is prompted for a desired target output dimensions of the resized image. The number of seams to be removed from the image is automatically calculated based on a difference between the dimensions of the received source image and the target output dimensions given the pixel width of the seams to be removed. A seam carving algorithm then proceeds to automatically carve a plurality of seams through the image. Seams traverse a path of lowest pixel importance values. An energy for each seam is computed based on the cumulative sum of the importance values of pixels in the seam path. A first seam having a lowest energy is selected. Pixel values along the path of the selected seam are removed from the source image. Pixel importance values of the selected seam are deleted from the importance map along a same path as the selected seam. The following are repeated until the image has been reduced to the desired dimensions. New seams are again carved through the resized image. An energy is computed for each of the newly carved seams. Distances are computed for each seam relative to the previously removed seam. A weighting is computed for each seam using the weighting function and the calculated seam distances. The weighting for each seam is applied to each seam energy to produce a revised energy for each seam. A next seam having a lowest revised energy is automatically selected. Pixel values along the path of the selected seam are removed from the image. Pixel importance values are removed from the importance map along a same path as the selected seam. A determination is made whether the image has been reduced to the desired target output dimensions. If not, the process repeats until the image has been effectively reduced to the target dimensions. If the image has been reduced to the desired target dimensions, then the reduced image is provided to an image output device.

In the implementation wherein a user selects "ENLARGEMENT", the image to be resized is placed on the paten of a scanner and scanned into digitized form. An image operator used to determine pixel importance values is selected. An importance map is automatically generated from the pixel importance values. A weighting function is selected which creates a distribution which having a minimum at center of the plot (a location of a previously added seam) and which increases on either side of the minimum. The user is prompted to input target dimensions of the enlarged image. A number of seams to be added to the image is determined based on the target dimensions. A seam carving algorithm automatically carves a plurality of seams through the image using the pixel importance values of the importance map. Seams are carved following a path of pixels having a highest importance value. An energy is computed for each seam using sum of pixel importance values in each seam. A first seam having a maximum energy is selected. A new seam is created having a same path as the selected seam. Values are assigned to each pixel in the path of the newly created seam by averaging pixel values on either side of the pixel. The pixel values of the new seam are inserted into the image at a location adjacent to the selected seam. An importance value is determined for each pixel in the newly inserted seam using the image operator. The pixel importance values are added to the importance map along a same path as the new seam. The following are repeated until the image has been resized to the desired dimensions. A plurality of seams are again carved through the resized image. An energy is computed for each of the new seams based on the pixel importance values of the pixels along the seam path. A distance is calculated between each seam and the previously inserted seam. A weighting for each seam is computed using the weighting function and the calculated seam distances. The weighting is applied to each seam energy to produce a revised energy for each seam. A seam having a maximum revised energy is selected. A new seam is created having a same path as the selected seam. Values are assigned to the pixels of the newly created seam. The pixel values of the new seam are inserted into the image at a location adjacent to the selected seam. Importance values are determined for the pixels in the new seam using the image operator. The pixel importance values are added to the importance map along a same path as the newly inserted seam. A determination is made whether the determined number of seams have been added to the image (the image has been sufficiently enlarged to the desired target dimension). If not, the process repeats until the desired number of seams have been added to the image sufficient to enlarge the image to the desired target output dimensions. If so then processing stops and the enlarged image is provided to an image output device.

Figure 11:
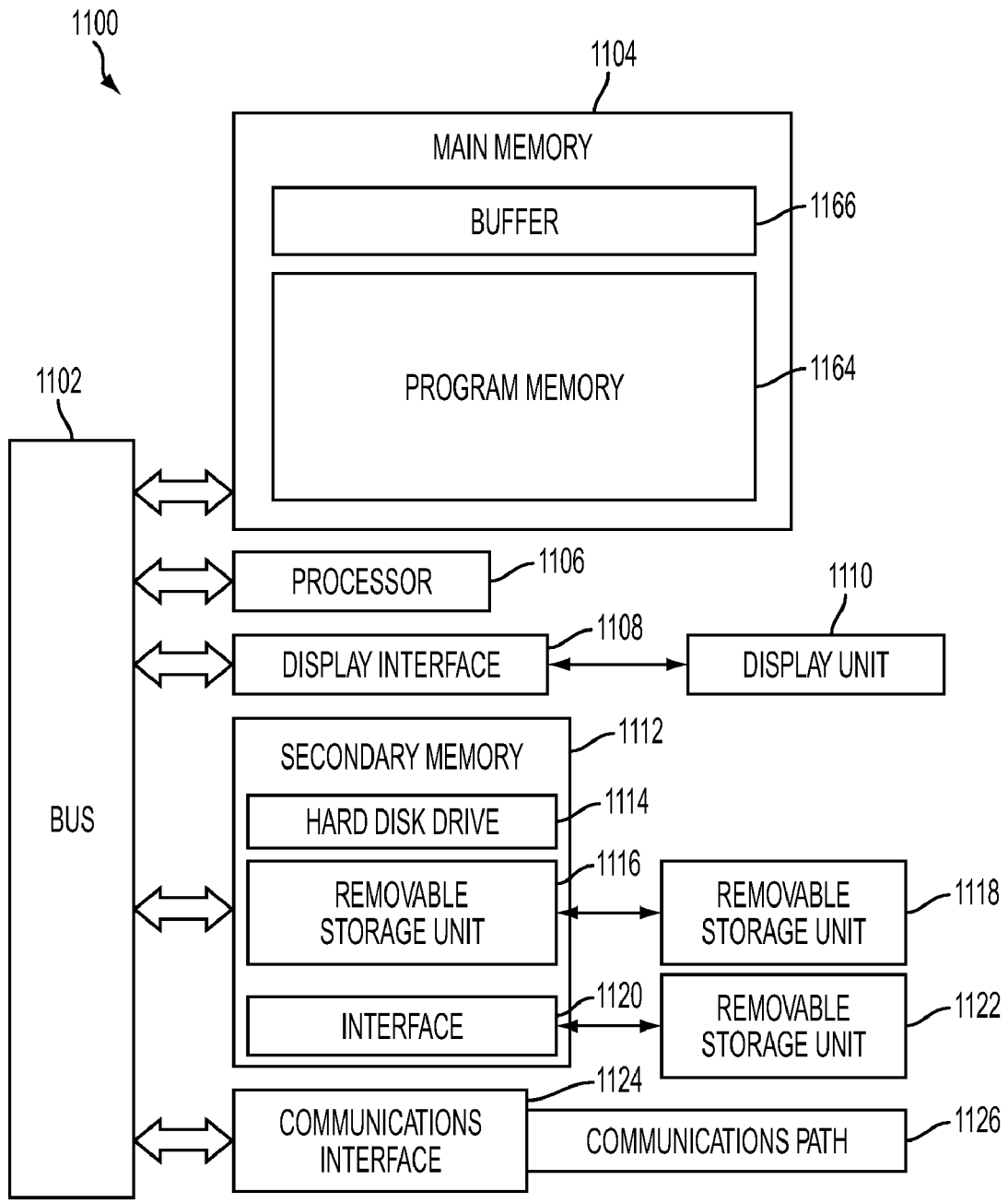
FIG. 11 illustrates a block diagram of one embodiment of a special purpose computer system useful for implementing one or more aspects of the present image resizing method.

Reference is now made to FIG. 11 which illustrates a block diagram of one example embodiment of a special purpose computer system useful for implementing one or more aspects of the present method. Such a system could be implemented as a separate computer system, or as electronic circuit, or in an ASIC, for example. The nature of the exact implementation will depend on the image processing environment wherein the present image resizing method finds its intended uses.

Special purpose computer system 1100 includes processor 1106 for executing machine executable program instructions for carrying out the present image resizing method. The processor is in communication with bus 1102. The system includes main memory 1104 for storing machine readable instructions. Main memory may comprise random access memory (RAM) to support reprogramming and flexible data storage. Buffer 1166 stores data addressable by the processor. Program memory 1164 stores program instructions. A display interface 1108 forwards data from bus 1102 to display 1110. Secondary memory 1112 includes a hard disk 1114 and storage device 1116 capable of reading/writing to removable storage unit 1118, such as a floppy disk, magnetic tape, optical disk, etc. Secondary memory 1112 further includes other mechanisms for allowing programs or other machine executable instructions to be loaded into the processor. Such mechanisms may include, for example, a storage unit 1122 adapted to exchange data through interface 1120 which enables the transfer of software and data to the processor. The system includes a communications interface 1124 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 1126 which carries such signals and may be implemented using wire, cable, fiber optic, phone line, cellular link, RF, memory, or other means known in the arts.

Figure 12:
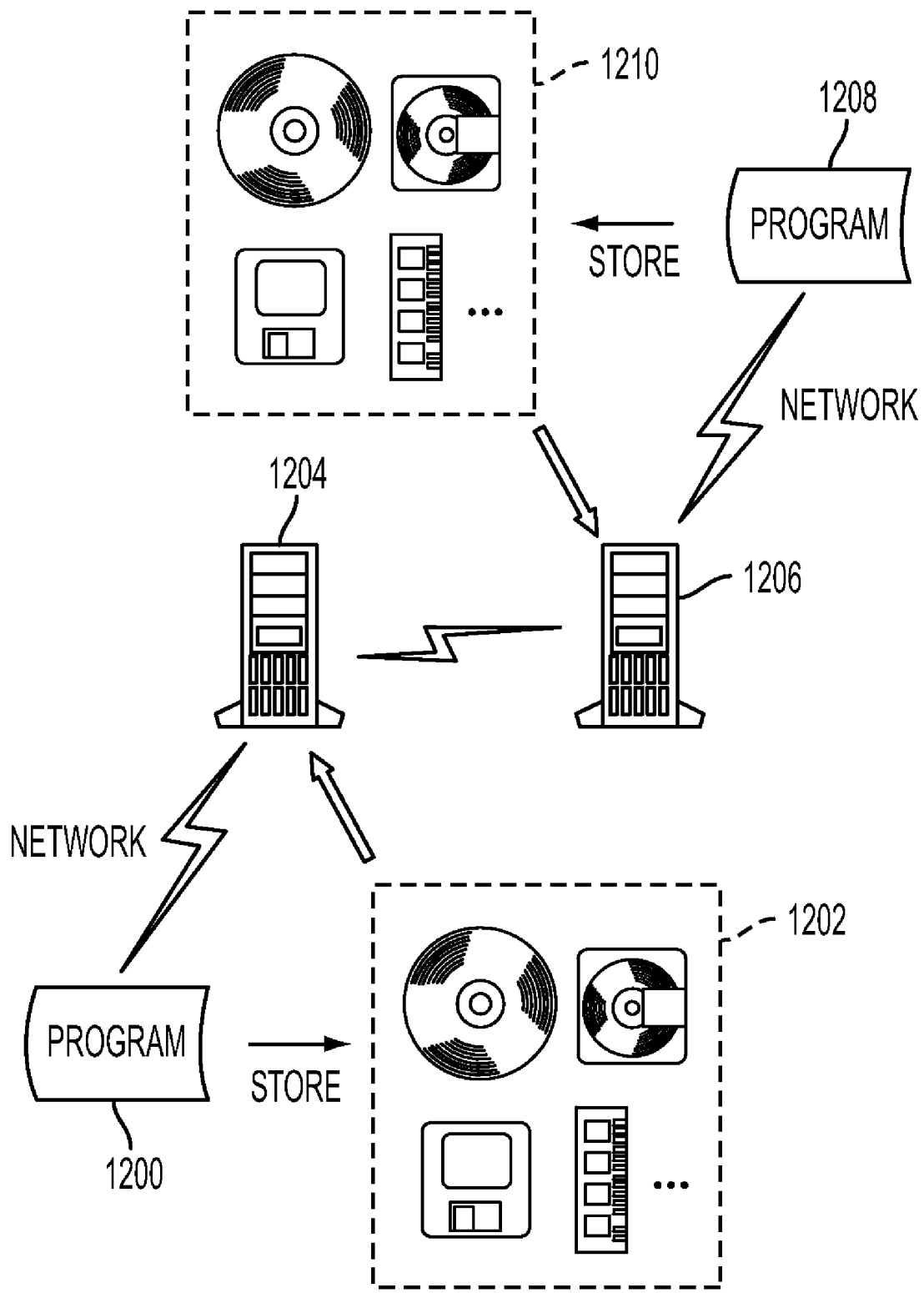
FIG. 12 is an explanatory diagram illustrating one example computer readable medium capable of storing machine readable instructions which, when mounted on a computer or a special purpose computer system, causes the system to perform one or more aspects of the present method.

Reference is now made to FIG. 12 which is an explanatory diagram illustrating one example of a computer readable storage medium capable of storing machine readable instructions which, when mounted on a computer or a special purpose computer system, causes the system to perform one or more aspects of the present image resizing method (image reduction and/or image enlargement) as described above. The machine readable instructions may be modified by one computer and transferred to another computer. In the illustrated embodiment, one or more computer programs 1200 for carrying out the present method are loaded on a computer-readable storage media 1202 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states or orientations in response to program instructions having been transferred to the media. The computer programs containing machine executable instructions of the present method can then be mounted on computer 1204 and transferred or otherwise communicated to computer 1206. The program instructions can then be off-loaded to another medium 1208, in original form or modified, including data, and stored on storage media 1210. Both of the computer systems include processors capable of executing machine readable program instructions. The processor may be placed in communication with an image scanning device (not shown) for receiving the source image's pixel values directly therefrom.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein. Computer readable medium may additionally comprise information in a transitory state medium such as a network link or a network interface which may include a wired network or a wireless network which allows a computer to read such computer readable information.

It should be understood that the flow diagrams hereof are intended to be illustrative. Other operations may be added, modified, enhanced, or consolidated. Variations thereof are intended to fall within the scope of the appended claims.

It should also be understood that one or more aspects of the present method are intended to be incorporated in an article of manufacture, including one or more computer program products. The article of manufacture may be included on at least one storage device readable by a machine architecture, xerographic, color management, or other image processing system capable of executing program instructions. The article of manufacture may be included as part of a xerographic system, color management system, an operating system, a software program, a plug-in, and the like, as are known in the arts. Such an article of manufacture may further be shipped, sold, leased, or otherwise provided either alone or as part of an add-on, update, upgrade, or product suite by the assignee or a licensee hereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for content aware resizing of a digital image in an image processing system, the method comprising:

receiving an image having a plurality of pixels;

defining a weighting function based on a resizing to be performed on said image, said weighting function generating a distribution as a function of distance;

determining an importance value for each pixel in said image to generate an importance map for said image; and repeating until a target size of said image has been achieved:

carving a plurality of pixel paths through said image, each path comprising a seam traversing said image;

calculating an energy for each seam, said seam energy being based on importance values of pixels along a same path through said importance map;

calculating a distance between each seam and a previously selected seam;

calculating a weighting for each seam using said weighting function and said calculated seam distance and applying each weighting to said seam energy to produce a revised energy for each seam;
selecting a seam based on said revised energy;
revising said importance map; and
resizing said image at a location of said selected seam.

2. The method of claim 1, further comprising:
selecting at least one image operator for said image, said image operator being responsive to changes in pixels based on image content; and
using said at least one image operator to determine an importance value for each pixel, each pixel importance value being determined with respect to neighboring pixels surrounding said pixel.

3. The method of claim 1, wherein calculating said energy for each seam comprises computing a sum of importance values of pixels in said seam path.

4. The method of claim 1, wherein said defined weighting function creates a distribution which peaks at a location of a previously removed seam and which tapers off on either side of said peak, said resizing being an image reduction operation and further comprising:
selecting a seam with a minimum revised energy;
removing said selected seam from said image; and
deleting pixel importance values from said importance map along a same path as said removed seam.

5. The method of claim 1, wherein said defined weighting function creates a distribution which has a minimum at a location of a previously added seam and which increases on either side of said minimum, said resizing being an image enlargement operation and further comprising:
selecting a seam with a maximum revised energy;
creating a new seam having a same path as said selected seam;
determining a pixel value for each pixel in said new seam;
inserting said new seam in said image at a location adjacent to said path of said selected seam;
determining an importance value for each pixel in said new seam; and
adding said determined pixel importance values to said importance map along a same path as said newly inserted seam.

6. The method of claim 1, wherein calculating a distance d between a first seam $S_{x1}$ and a second seam $S_{x2}$ comprises:

$$d(S_{x1}, S_{x2}) = \sum_{i=1}^{n} (|s_{x1,1}^{(i)} - s_{x2,1}^{(i)}| + |s_{x1,2}^{(i)} - s_{x2,2}^{\prime(i)}|),$$

where $S_{x1} = \{(s_{x1,1}^{(i)}, s_{x1,2}^{(i)})\}_{i=1}^{n}$, $S_{x2} = \{(s_{x2,1}^{(i)}, s_{x2,2}^{(i)})\}_{i=1}^{n}$ and n is a number of pixels along a boundary of said image.

7. The method of claim 1, further comprising:
determining a number of seams to be selected to resize said image to said target size; and
repeating until said determined number of seams have been selected.

8. A system for content aware resizing of a digital image in an image processing system, the system comprising:
a memory;
a storage medium for storing data; and
a processor in communication with said storage medium and said memory, said processor executing machine readable instructions performing:
receiving an image having a plurality of pixels;
defining a weighting function based on a resizing to be performed on said image, said weighting function generating a distribution as a function of distance;
determining an importance value for each pixel in said image to generate an importance map for said image; and
repeating until a target size of said image has been achieved:
carving a plurality of pixel paths through said image, each path comprising a seam traversing said image;
calculating an energy for each seam, said seam energy being based on importance values of pixels along a same path through said importance map;
calculating a distance between each seam and a previously selected seam;
calculating a weighting for each seam using said weighting function and said calculated seam distance and applying each weighting to said seam energy to produce a revised energy for each seam;
selecting a seam based on said revised energy;
revising said importance map; and
resizing said image at a location of said selected seam.

9. The system of claim 8, further comprising:
selecting at least one image operator for said image, said image operator being responsive to changes in pixels based on image content; and
using said at least one image operator to determine an importance value for each pixel, each pixel importance value being determined with respect to neighboring pixels surrounding said pixel.

10. The system of claim 8, wherein calculating said energy for each seam comprises computing a sum of importance values of pixels in said seam path.

11. The system of claim 8, wherein said defined weighting function creates a distribution which peaks at a location of a previously removed seam and which tapers off on either side of said peak, said resizing being an image reduction operation and further comprising:
selecting a seam with a minimum revised energy;
removing said selected seam from said image; and
deleting pixel importance values from said importance map along a same path as said removed seam.

12. The system of claim 8, wherein said defined weighting function creates a distribution which has a minimum at a location of a previously added seam and which increases on either side of said minimum, said resizing being an image enlargement operation and further comprising:
selecting a seam with a maximum revised energy;
creating a new seam having a same path as said selected seam;
determining a pixel value for each pixel in said new seam;
inserting said new seam in said image at a location adjacent to said path of said selected seam;
determining an importance value for each pixel in said new seam; and
adding said determined pixel importance values to said importance map along a same path as said newly inserted seam.

13. The system of claim 8, wherein calculating a distance d between a first seam $S_{x1}$ and a second seam $S_{x2}$ comprises:

$$d(S_{x1}, S_{x2}) = \sum_{i=1}^{n} (|s_{x1,1}^{(i)} - s_{x2,1}^{(i)}| + |s_{x1,2}^{(i)} - s_{x2,2}^{\prime(i)}|),$$

where $S_{x1} = \{(s_{x1,1}^{(i)}, s_{x1,2}^{(i)})\}_{i=1}^{n}$, $S_{x2} = \{(s_{x2,1}^{(i)}, s_{x2,2}^{(i)})\}_{i=1}^{n}$, and n is a number of pixels along a boundary of said image.

14. The system of claim 8, further comprising:
- determining a number of seams to be selected to resize said image to said target size; and
- repeating until said determined number of seams have been selected.

15. A computer program product for content aware resizing of a digital image in an image processing system, the computer program product comprising:
- a non-transitory computer-readable medium for storing instructions that, when executed on a computer, cause the computer to perform a method comprising:
  - receiving an image having a plurality of pixels;
  - defining a weighting function based on a resizing to be performed on said image, said weighting function generating a distribution as a function of distance;
  - determining an importance value for each pixel in said image to generate an importance map for said image; and
  - repeating until a target size of said image has been achieved:
    - carving a plurality of pixel paths through said image, each path comprising a seam traversing said image;
    - calculating an energy for each seam, said seam energy being based on importance values of pixels along a same path through said importance map;
    - calculating a distance between each seam and a previously selected seam;
    - calculating a weighting for each seam using said weighting function and said calculated seam distance and applying each weighting to said seam energy to produce a revised energy for each seam;
    - selecting a seam based on said revised energy;
    - revising said importance map; and
    - resizing said image at a location of said selected seam.

16. The computer program product of claim 15, further comprising:
- selecting at least one image operator for said image, said image operator being responsive to changes in pixels based on image content; and
- using said at least one image operator to determine an importance value for each pixel, each pixel importance value being determined with respect to neighboring pixels surrounding said pixel.

17. The computer program product of claim 15, wherein calculating said energy for each seam comprises computing a sum of importance values of pixels in said seam path.

18. The computer program product of claim 15, wherein said defined weighting function creates a distribution which peaks at a location of a previously removed seam and which tapers off on either side of said peak, said resizing being an image reduction operation and further comprising:
- selecting a seam with a minimum revised energy;
- removing said selected seam from said image; and
- deleting pixel importance values from said importance map along a same path as said removed seam.

19. The computer program product of claim 15, wherein said defined weighting function creates a distribution which has a minimum at a location of a previously added seam and which increases on either side of said minimum, said resizing being an image enlargement operation and further comprising:
- selecting a seam with a maximum revised energy;
- creating a new seam having a same path as said selected seam;
- determining a pixel value for each pixel in said new seam;
- inserting said new seam in said image at a location adjacent to said path of said selected seam;
- determining an importance value for each pixel in said new seam; and
- adding said determined pixel importance values to said importance map along a same path as said newly inserted seam.

20. The computer program product of claim 15, wherein calculating a distance d between a first seam $S_{x1}$ and a second seam $S_{x2}$ comprises:

$$d(S_{x1}, S_{x2}) = \sum_{i=1}^{n} (|s_{x1,1}^{(i)} - s_{x2,1}^{(i)}| + |s_{x1,2}^{(i)} - s_{x2,2}'^{(i)}|),$$

where $S_{x1} = \{(s_{x1,1}^{(i)}, s_{x1,2}^{(i)})\}_{i=1}^{n}$, $S_{x2} = \{(s_{x2,1}^{(i)}, s_{x2,2}^{(i)})\}_{i=1}^{n}$ and n is a number of pixels along a boundary of said image.

* * * * *